US012235548B2

(12) United States Patent
Li

(10) Patent No.: US 12,235,548 B2
(45) Date of Patent: Feb. 25, 2025

(54) DISPLAY PANEL, MANUFACTURING METHOD THEREOF, AND DISPLAY DEVICE

(71) Applicant: TCL CHINA STAR OPTOELECTRONICS TECHNOLOGY CO., LTD., Shenzhen (CN)

(72) Inventor: Liang Li, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/434,707

(22) PCT Filed: Jun. 30, 2021

(86) PCT No.: PCT/CN2021/103362
§ 371 (c)(1),
(2) Date: Aug. 27, 2021

(87) PCT Pub. No.: WO2022/262010
PCT Pub. Date: Dec. 22, 2022

(65) Prior Publication Data
US 2024/0019740 A1    Jan. 18, 2024

(30) Foreign Application Priority Data
Jun. 18, 2021  (CN) .......................... 202110678194.0

(51) Int. Cl.
*G02F 1/1343*  (2006.01)
*G02F 1/1335*  (2006.01)

(52) U.S. Cl.
CPC .... *G02F 1/13439* (2013.01); *G02F 1/133512* (2013.01); *G02F 1/133514* (2013.01)

(58) Field of Classification Search
None
See application file for complete search history.

(56) References Cited

U.S. PATENT DOCUMENTS 7,417,867 B1 *   8/2008  Matsuda ............. H05K 3/0094
                                                361/752
2004/0257509 A1 * 12/2004  Lee .................. H01L 24/06
                                                349/139

(Continued)

FOREIGN PATENT DOCUMENTS

CN   104111564 A   10/2014
CN   104238806 A   12/2014

(Continued)

OTHER PUBLICATIONS

Chinese Office Action in corresponding Chinese Patent Application No. 202110678194.0 dated Feb. 10, 2022, pp. 1-8.

(Continued)

*Primary Examiner* — Shan Liu
(74) *Attorney, Agent, or Firm* — PV IP PC; Wei Te Chung

(57) ABSTRACT

The present application provides a display panel, a manufacturing method thereof, and a display device. The display panel includes an upper substrate and a lower substrate that are arranged opposite to each other, a liquid crystal layer, a first electrode layer, and a second electrode layer, wherein the first electrode layer is disposed on a side of the upper substrate close to or away from the liquid crystal layer, the second electrode layer is disposed on a side of the upper substrate away from the first electrode layer, and the first electrode layer and the second electrode layer are electrically connected to each other.

16 Claims, 4 Drawing Sheets

(56) References Cited

U.S. PATENT DOCUMENTS

| | | | | |
|---|---|---|---|---|
| 2011/0140117 A1* | 6/2011 | Lee | ............ | H01L 27/12 438/34 |
| 2013/0154977 A1* | 6/2013 | Lee | ............ | G02F 1/133528 445/24 |
| 2013/0201429 A1* | 8/2013 | Xu | ............ | G02F 1/1368 349/95 |
| 2013/0286610 A1* | 10/2013 | Nakagawa | ............ | H05K 3/426 174/255 |
| 2014/0375907 A1* | 12/2014 | Wu | ............ | G06F 3/04164 349/12 |
| 2017/0139297 A1* | 5/2017 | Cao | ............ | G02F 1/1368 |
| 2018/0074357 A1* | 3/2018 | Chen | ............ | G06F 3/0443 |
| 2019/0041680 A1* | 2/2019 | Yoshida | ............ | G02F 1/133308 |
| 2019/0369792 A1* | 12/2019 | Shi | ............ | G06F 3/0412 |

FOREIGN PATENT DOCUMENTS

| | | | |
|---|---|---|---|
| CN | 105118453 A | | 12/2015 |
| CN | 106896599 A | | 6/2017 |
| CN | 108445694 A | | 8/2018 |
| CN | 109143658 A | | 1/2019 |
| CN | 210428008 U | | 4/2020 |
| CN | 210428022 U | | 4/2020 |
| CN | 111240117 A | | 6/2020 |
| CN | 111983861 A | * | 11/2020 |
| JP | H11274733 A | | 10/1999 |
| JP | 2002040465 A | | 2/2002 |
| JP | 2002040466 A | | 2/2002 |
| JP | 2002040467 A | * | 2/2002 |
| KR | 20050047675 A | | 5/2005 |

OTHER PUBLICATIONS

International Search Report in International application No. PCT/CN2021/103362, mailed on Feb. 25, 2022.

Written Opinion of the International Searching Authority in International application No. PCT/CN2021/103362, mailed on Feb. 25, 2022.

* cited by examiner providing an upper substrate; — S10 forming a first electrode layer on one side of the upper substrate by magnetron sputtering, vacuum evaporation, or inkjet printing; — S20 forming a second electrode layer on a side of the upper substrate away from the first electrode layer by magnetron sputtering, vacuum evaporation, or inkjet printing, the second electrode layer being electrically connected to the first electrode layer; and — S30 arranging the upper substrate and the lower substrate opposite to each other, and filling a liquid crystal layer between the lower substrate and the upper substrate. — S40

FIG. 5

DISPLAY PANEL, MANUFACTURING METHOD THEREOF, AND DISPLAY DEVICE

RELATED APPLICATIONS

This application is a Notional Phase of PCT Patent Application No. PCT/CN2021/103362 having international filing date of Jun. 30, 2021, which claims the benefit of priority of Chinese Patent Application No. 202110678194.0 filed on Jun. 18, 2021. The contents of the above applications are all incorporated by reference as if fully set forth herein in their entirety.

BACKGROUND OF INVENTION

Field of Invention

The present application relates to the field of display technology, in particular to manufacture of display devices, and in particular to a display panel, a manufacturing method thereof, and a display device.

Description of Prior Art

In a liquid crystal display (LCD), a corresponding signal is transmitted to each pixel electrode to form a voltage difference between the pixel electrode and the common electrode of an upper plate to drive deflection of liquid crystal molecules, so as to control degree of polarization of each pixel point, thereby achieving display purpose.

At present, the common electrode of the upper plate is generally made of ITO (Indium Tin Oxide, indium tin oxide), but ITO has a poor conductivity and a large sheet resistance. When a signal in a data line changes, a voltage of the common electrode of the upper plate will be changed due to a capacitive coupling effect, and the voltage of the common electrode is difficult to restore to the preset potential in a short time, subsequently causing a voltage difference between two ends of the liquid crystals to be too large or too small, resulting in horizontal crosstalk, and reducing quality of displayed image.

Therefore, there is a need to provide a display panel, a manufacturing method thereof, and a display device that can alleviate the horizontal crosstalk phenomenon and improve the display quality.

SUMMARY OF INVENTION

An object of the present application is to provide a display panel, a manufacturing method thereof, and a display device, so as to alleviate the technical problem that a common electrode of an upper plate is difficult to restore to the preset potential in a short time due to the large sheet resistance of the common electrode.

An object of the present application is to provide a display panel, a manufacturing method thereof, and a display device, so as to improve the technical problem that a common electrode of an upper plate is difficult to restore to the preset potential in a short time due to a large sheet resistance of the common electrode.

An embodiment of the present application provides a display panel, and the display panel includes:
a lower substrate;
an upper substrate arranged opposite to the lower substrate;
a liquid crystal layer filled between the lower substrate and the upper substrate;
a first electrode layer disposed on a side of the upper substrate close to or away from the liquid crystal layer; and
a second electrode layer disposed on a side of the upper substrate away from the first electrode layer, and electrically connected to the first electrode layer.

In one embodiment, the display panel includes a non-display area, the upper substrate includes at least one via hole, and each of the at least one via hole is located in the non-display area; and
wherein the display panel further includes a conductive portion, the conductive portion is located in the at least one via hole, and the first electrode layer and the second electrode layer are electrically connected to each other through the conductive portion.

In one embodiment, the upper substrate includes a plurality of via holes, and the plurality of via holes are arranged at least on opposite sides of the upper substrate.

In one embodiment, the conductive portion includes a conductive ball located in the via hole, or the conductive portion includes a metal layer extending from a sidewall of the via hole to an upper side and a lower side of the upper substrate.

In one embodiment, the conductive ball has an ellipsoidal shape, and a long axis of the conductive ball is perpendicular to the first electrode layer.

In one embodiment, the metal layer extends from the sidewall of a corresponding one of the via hole to upper and lower sides around the via hole to electrically connect the first electrode layer to the second electrode layer.

In one embodiment, the metal layer and the first electrode layer are made of a same material.

In one embodiment, a resistivity of the conductive portion is less than a resistivity of the first electrode layer, and a resistivity of the conductive portion is less than a resistivity of the second electrode layer.

In one embodiment, the display panel further includes:
a protective layer disposed on a side of the first electrode layer away from the upper substrate, and the protective layer being insulative.

In one embodiment, the display panel further includes:
a filter layer arranged opposite to the second electrode layer, wherein the filter layer includes a plurality of filter portions, and a plurality of gaps are defined between adjacent ones of the filter portions; and
a light-shielding layer disposed on a side of the second electrode layer close to the filter layer, wherein the light-shielding layer includes a plurality of light-shielding portions, and the plurality of light-shielding portions are respectively arranged opposite to the plurality of gaps.

Another embodiment of the present application also provides a method of manufacturing a display panel, which is used to manufacture the display panel, and the method includes:
providing a substrate;
forming a first electrode layer on one side of the upper substrate by magnetron sputtering, vacuum evaporation, or inkjet printing;
forming a second electrode layer on a side of the upper substrate away from the first electrode layer by magnetron sputtering, vacuum evaporation, or inkjet printing, the second electrode layer being electrically connected to the first electrode layer; and
arranging the upper substrate and the lower substrate opposite to each other, and filling a liquid crystal layer between the lower substrate and the upper substrate.

In one embodiment, the display panel includes a non-display area, the upper substrate includes at least one via hole, and each of the at least one via hole is located in the non-display area; and wherein before the step of forming the first electrode layer on the side of the upper substrate by magnetron sputtering, vacuum evaporation, or inkjet printing, the method further includes:

forming a conductive portion at an upper side and a lower side around the via hole and a sidewall of the via hole by vapor deposition, the conductive portion being electrically connected to the first electrode layer and the second electrode layer.

In one embodiment, after the step of forming the second electrode layer on the side of the upper substrate away from the first electrode layer by magnetron sputtering, vacuum evaporation, or inkjet printing, the second electrode layer being electrically connected to the first electrode layer, the method further includes:

forming a protective layer on the first electrode layer, the protective layer being insulative.

In one embodiment, after the step of forming the protective layer on the first electrode layer, the protective layer being insulative, the method further includes:

forming a light-shielding layer on the second electrode layer, wherein the light-shielding layer includes a plurality of light-shielding portions.

Still another embodiment of the present application also provides a display device, the display device includes a display panel, and the display panel includes:

a lower substrate;

an upper substrate arranged opposite to the lower substrate;

a liquid crystal layer filled between the lower substrate and the upper substrate;

a first electrode layer disposed on a side of the upper substrate close to or away from the liquid crystal layer; and a second electrode layer disposed on a side of the upper substrate away from the first electrode layer, and electrically connected to the first electrode layer.

In one embodiment, the display panel includes a non-display area, the upper substrate includes at least one via hole, and each of the at least one via hole is located in the non-display area; and wherein the display panel further includes a conductive portion, the conductive portion is located in the at least one via hole, and the first electrode layer and the second electrode layer are electrically connected to each other through the conductive portion.

In one embodiment, the upper substrate includes a plurality of via holes, and the plurality of via holes are arranged at least on opposite sides of the upper substrate.

In one embodiment, the conductive portion includes a conductive ball located in the via hole, or the conductive portion includes a metal layer extending from a sidewall of the via hole to an upper side and a lower side of the upper substrate.

In one embodiment, the metal layer extends from the sidewall of a corresponding one of the via hole to upper and lower sides around the via hole to electrically connect the first electrode layer to the second electrode layer.

In one embodiment, a resistivity of the conductive portion is less than a resistivity of the first electrode layer, and a resistivity of the conductive portion is less than a resistivity of the second electrode layer.

The present application provides a display panel, a manufacturing method thereof, and a display device. The display panel includes: a lower substrate; an upper substrate arranged opposite to the lower substrate; a liquid crystal layer filled between the lower substrate and the upper substrate; a first electrode layer disposed on a side of the upper substrate close to or away from the liquid crystal layer; and a second electrode layer disposed on a side of the upper substrate away from the first electrode layer, and electrically connected to the first electrode layer. In this solution, the first electrode layer and the second electrode layer that are electrically connected to each other are respectively provided on opposite sides of the upper substrate, and an overall resistance of the first electrode layer and the second electrode layer is relatively small, that is, a capacitive coupling effect between an entirety of the first electrode layer and the second electrode layer and a data line on a lower plate is weakened, and therefore it can shorten the time period for the first electrode layer and the second electrode layer to return to the preset potential to weaken the horizontal crosstalk, and can also reduce influence on a signal in the data line, and ultimately improving quality of displayed image.

BRIEF DESCRIPTION OF DRAWINGS

The technical solutions and other beneficial effects of the present application will be made obvious by describing the specific implementations of the present application in detail below in conjunction with the accompanying drawings.

FIG. 5 is a flowchart of a method of manufacturing a display panel provided by an embodiment of the application.

DETAILED DESCRIPTION OF PREFERRED EMBODIMENTS

Figure 1:
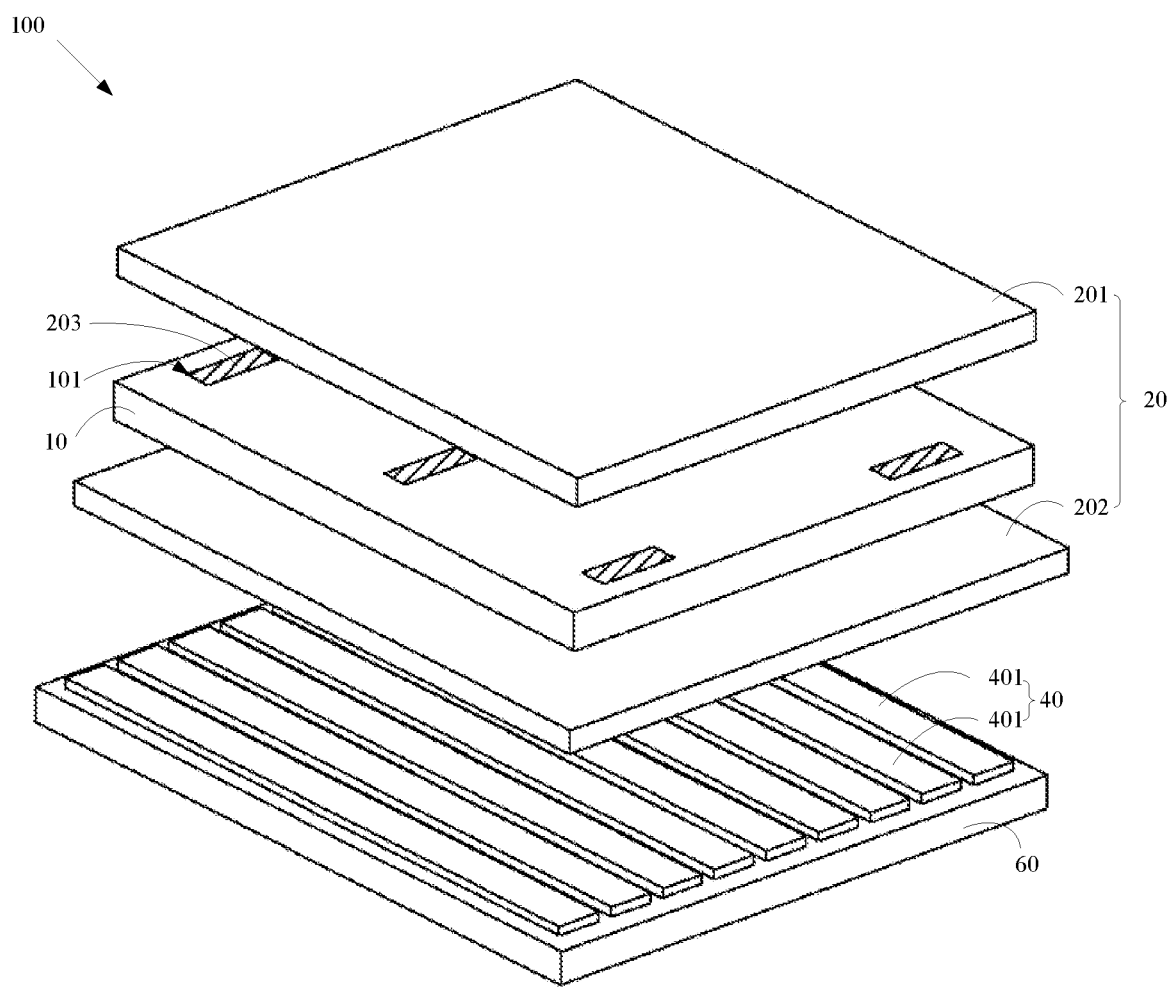
FIG. 1 is an expanded schematic diagram of a three-dimensional structure of a display panel provided by an embodiment of the application.

The technical solutions in the embodiments of the present disclosure will be clearly and completely described below in conjunction with the accompanying drawings in the embodiments of the present disclosure. Obviously, the described embodiments are only a portion of the embodiments of the present disclosure, rather than all the embodiments. Based on the embodiments of the present disclosure, all other embodiments obtained by those skilled in the art without creative work shall fall within the protection scope of the present disclosure.

In the description of the present disclosure, it should be understood that the orientation or positional relationship indicated by the terms "upper", "lower", "near", "far away", etc. are based on the orientation or positional relationship shown in the drawings, for example, "upper" only refers to a surface above the object, specifically refers to directly above, obliquely above, or the upper surface, as long as it is above the level of the object; "both sides" or "two opposite ends" refer to the objects that can be shown in the figure The two positions can be in direct or indirect contact with the object. The above orientation or positional relationship is only for the convenience of describing the present invention and simplifying the description, rather than indicating or implying that the device or element referred to must have a specific orientation, be constructed and operated in a specific orientation. Therefore, it cannot be understood as a limitation of the present disclosure.

In addition, it should be noted that the drawings provide only the structures and steps closely related to the present disclosure, and omit some details that are not relevant to the present disclosure. The purpose is to simplify the drawings so that the inventive features are clear at a glance, and it does mean the actual device and method are exactly the same as the drawings, and the drawings should be not considered as a limitation of the actual device and method.

The present application provides a display panel. The display panel includes but is not limited to the following embodiments and the following combinations of embodiments.

In one embodiment, as shown in FIG. 1, the display panel 100 includes: a lower substrate 60; an upper substrate 10 arranged opposite to the lower substrate 60; a liquid crystal layer filled between the lower substrate 60 and the upper substrate 10; a first electrode layer 201 disposed on a side of the upper substrate 10 close to or away from the liquid crystal layer; and a second electrode layer 202 disposed on a side of the upper substrate 10 away from the first electrode layer 201, and electrically connected to the first electrode layer 201.

The upper substrate 10 may be a rigid substrate or a flexible substrate, wherein the rigid substrate may be glass or a silicon wafer, and the rigid substrate may be made of a material including, but not limited to, at least one of quartz powder, strontium carbonate, barium carbonate, boric acid, boric anhydride, aluminum oxide, calcium carbonate, barium nitrate, magnesium oxide, tin oxide, or zinc oxide; and wherein the flexible substrate may be a polymer material substrate, a metal foil substrate, an ultra-thin glass substrate, a composite substrate of polymers and inorganics, or a composite substrate of polymers, organics, and inorganics, and the polymer material may include at least one of polyethylene, polypropylene, polystyrene, polyethylene terephthalate, polyethylene terephthalate, or polyimide.

The first electrode layer 201 and the second electrode layer 202 both have conductivity and are both transparent. Further, the first electrode layer 201 and the second electrode layer 202 may be made of a same material or different materials. Specifically, the materials of the first electrode layer 201 and the second electrode layer 202 may include, but are not limited to, ITO, and the first electrode layer 201 and the second electrode layer 202 may be prepared by, but not limited to, magnetron sputtering, vacuum evaporation, and inkjet printing.

It can be understood that, as shown in FIG. 1, the first electrode layer 201 and the second electrode layer 202 in this embodiment are respectively disposed on opposite sides of the upper substrate 10 and are electrically connected to each other, that is, the first electrode layer 201 and the second electrode layer 202 can be electrically connected to form a conductive composite electrode layer 20 through electrical connection. Compared with the prior art where an electrode layer is only disposed a side of an upper substrate 10 close to a lower plate, the composite electrode layer 20 in this embodiment exhibits a lower resistance, that is, a capacitive coupling effect between the composite electrode layer 20 and a data line on a lower plate is smaller, which can alleviate horizontal crosstalk, and the composite electrode layer 20 has less influence on a signal in the data line on the lower plate, thus ultimately improving quality of displayed image.

It should be noted that since the first electrode layer 201 in this embodiment is located on the side of the upper substrate 10 away from the second electrode layer 202, that is, a distance between a side of the composite electrode layer 20 close to the lower plate and the lower plate will not be decreased, that is, compared with a distance between the electrode layer and the lower plate in the prior art, the distance between the composite electrode layer 20 and the lower plate in this embodiment is not decreased, and that is, the composite electrode layer 20 will not increase the interference on the signal in the data line on the lower plate.

In one embodiment, as shown in FIG. 1, the display panel 100 includes a non-display area. The upper substrate 10 includes at least one via hole 101, and each of the via hole 101 is located in the non-display area. The display panel 100 further includes a conductive portion 203 located in the at least one via hole 101, and the first electrode layer 201 and the second electrode layer 202 are electrically connected to each other through the conductive portion 203.

It is appreciated that each of the via holes 101 is located in the non-display area to prevent hollowing out in the display area to impact the image display. Further, the non-display area may be, but not limited to, an area close to an edge of the display panel. When the upper substrate 10 includes a via hole 101, the via hole 101 may be located in an area close to either side of the upper substrate 10, and the conductive portion 203 is located in the via hole 101, and a size of the via hole 101 can be set larger to ensure that the first electrode layer 201 and the second electrode layer 202 are electrically connected to each other. When the upper substrate 10 includes a plurality of the via holes 101, the plurality of via holes 101 may be arranged at least on opposite sides of the upper substrate 10, and sizes of the plurality of via holes 101 may be the same or different, a number and sizes of the via holes 101 can be set reasonably to ensure that the first electrode layer 201 and the second electrode layer 202 are electrically connected to each other. Of course, the plurality of the via holes 101 may also be at least arranged at an area near two ends of a diagonal line of the upper substrate and the conductive portion 203 is located in at least one of the via holes 101 in the area near the two ends of one of the diagonal lines in the upper substrate 10.

Before the conductive portion 203 is fixed in a corresponding one of the via holes 101, a height of the conductive portion 203 may not be less than a height of the corresponding one of the via holes 101 to ensure that opposite ends of the conductive portion 203 can be electrically connected to the first electrode layer 201 and the second electrode layer 202, respectively, to ensure that the first electrode layer 201 and the second electrode layer 202 are electrically connected to each other. It is appreciated that after the conductive portion 203 is fixed in the corresponding one of the via holes 101, the height of the conductive portion 203 may be equal to the height of a corresponding one of the via holes 101, so as to prevent a pad height from impacting a height of the subsequently formed first electrode layer 201 or the second electrode layer 202 at the via hole 101. A projection of the conductive portion 203 on the upper substrate 10 may be located in the corresponding one of the via holes 101, that is, a size of the cross-section of the conductive portion 203 may be smaller than a size of the cross-section of the corresponding one of the via holes 101, thereby reducing cost of the conductive portion 203.

Figure 2:
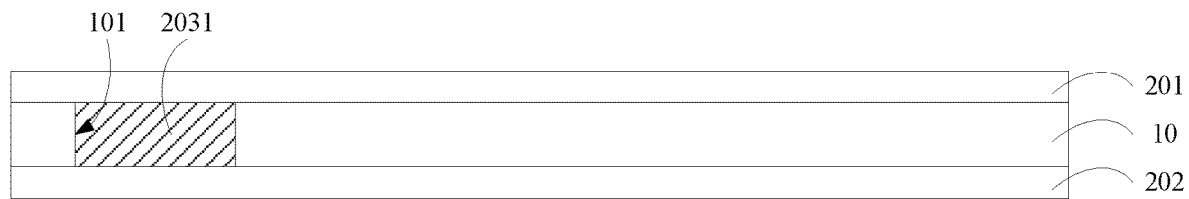
FIG. 2 is a schematic cross-sectional diagram of a display panel provided by an embodiment of the application.
Figure 3:
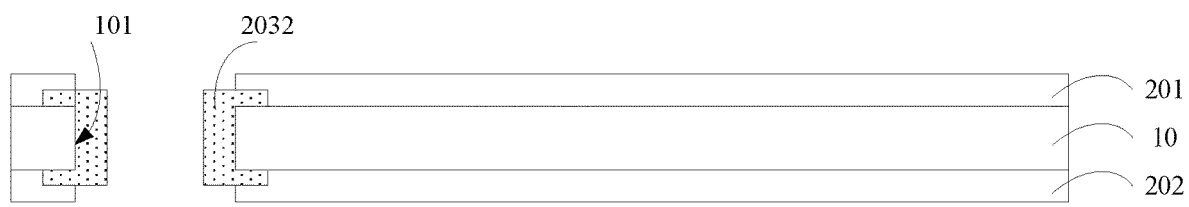
FIG. 3 is a schematic cross-sectional diagram of another display panel provided by an embodiment of the application.

In an embodiment, as shown in FIGS. 2 and 3, the conductive portion 203 includes a conductive ball 2031 located in the via hole 101, or the conductive portion 203 includes a metal layer 2032 extending from a sidewall of the via hole to an upper side and a lower side of the upper substrate 10. The conductive ball 2031 may be in a shape of an ellipsoid, a long axis of the conductive ball 2031 may be perpendicular to the first electrode layer 201, a number of the conductive ball 2031 may be greater than 1, and the metal layer 2032 extends from the sidewall of a corresponding one of the via hole 101 to upper and lower sides around the via hole 101 to electrically connect the first electrode layer 201 and the second electrode layer 202. Specifically, the conductive ball 2031 may be directly placed in the via hole 101 or a metal material may be deposited in the via hole 101 to form the metal layer 2032. Specifically, a material of the conductive ball 2031 may include, but is not limited, to gold, and a material of the metal layer 2032 includes, but is not limited to, copper, aluminum, or molybdenum.

It should be noted that when the conductive portion 203 includes the conductive ball 2031, as shown in FIG. 2, the first electrode layer 201 may be formed before the at least one via hole 101 is formed, and then the electrode layer 201 is used as a support to place at least one conductive ball 2031 in the receiving space formed by the first electrode layer 201 and the via hole 101. It should be noted that when the conductive portion 203 includes the metal layer 2032, the first electrode layer 201 may be formed before at least one of the via holes 101 is formed. Likewise, the metal layer 2032 is formed on a bottom and sidewalls of the receiving space formed by the first electrode layer 201 and the via hole 101, and the metal layer 2032 extends to upper and lower sides around the via hole 101; or alternatively, as shown in FIG. 3, the first electrode layer 201 may be formed after at least one of the via hole 101 and the metal layer 2032 are formed. Specifically, after the via hole 101 is formed, the metal layer 2032 is formed on the upper and lower sides around the via hole 101, and the metal layer 2032 is also formed on the sidewall of the via hole 101.

In particular, the metal layer 2032 can also be made of ITO. In this case, ITO material can be deposited on one side of the upper substrate 10 to sequentially form the metal layer 2032 filled in the via hole 101 and the first electrode layer 201, that is, the metal layer 2032 and the first electrode layer 201 can be produced through a single process. Further, the upper substrate 10 can be flipped over, and then the ITO material is deposited on the other side of the upper substrate 10 to form the second electrode layer 202 on an entire surface.

The first electrode layer 201 and the second electrode layer 202 may also be electrically connected to each other by a conductive wire located on the sidewall of at least one edge of the display panel 100, a material of the conductive wire may include but not limited to copper, and opposite ends of the conductive wire are electrically connected to the edge of the first electrode layer 201 and the edge of the second electrode layer 202, respectively. It is appreciated that electrically connecting the first electrode layer 201 to the second electrode layer 202 through the conductive wire can prevent providing the via hole 101 on the upper substrate 10 and providing the conductive portion 203 in the via hole 101.

In an embodiment, a resistivity of the conductive portion 203 is less than a resistivity of the first electrode layer 201, and a resistivity of the conductive portion 203 is less than a resistivity of the second electrode layer 202. It is appreciated that setting the resistivity of the conductive portion 203 to be smaller can prevent increasing resistance of the composite electrode layer 20 and reduce capacitive coupling effect between the composite electrode layer 20 and the data lines on a lower plate. Likewise, when the conductive wire is provided, a resistivity of the conductive wire may also be less than the resistivity of the first electrode layer 201, and the resistivity of the conductive wire is less than the resistivity of the second electrode layer 202.

Figure 4:
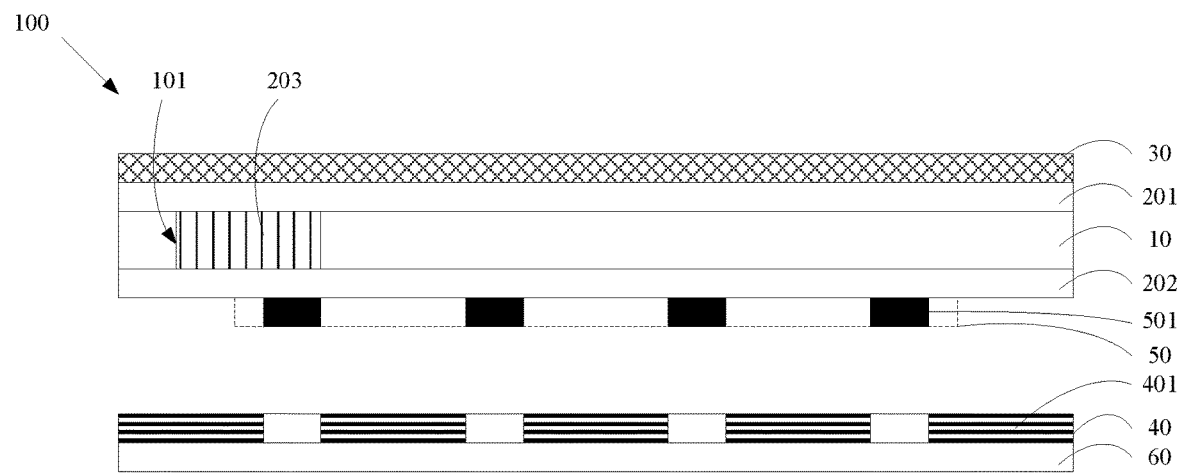
FIG. 4 is a schematic cross-sectional diagram of a further display panel provided by an embodiment of the application.

In one embodiment, as shown in FIG. 4, the display panel 100 further includes a protective layer 30, which is located on a side of the first electrode layer 201 away from the upper substrate 10, and the protective layer 30 his insulative. It should be noted that the protective layer 30 on the side away from the upper substrate 10 also includes layers such as a polarizer and a cover plate. The protective layer 30 is configured to isolate the first electrode layer 201 from the layers such as the polarizer and the like to prevent affecting the electrical and optical properties of the first electrode layer 201. Further, the protective layer 30 is also in a transparent color to prevent reducing light transmittance. Specifically, a material of the protective layer 30 may include, but is not limited to, at least one of silicon nitride or silicon oxide.

In one embodiment, as shown in FIGS. 1 and 4, the display panel 100 further includes: a filter layer 40, the filter layer 40 and the second electrode layer 202 are disposed opposite to each other, and the filter layer 40 includes a plurality of filter portions 401. There are gaps defined between adjacent ones of the filter portions 401. Further, as shown in FIG. 4, the display panel 100 further includes: a light-shielding layer 50, the light-shielding layer 50 is located on a side of the second electrode layer 202 close to the filter layer 40, the light-shielding layer 50 includes a plurality of light-shielding portions 501, and the plurality of light-shielding portions 501 are respectively disposed opposite to the plurality of gaps.

It is appreciated that the light-shielding layer 50 is provided on the side of the second electrode layer 202 close to the filter layer 40, so that a distance between the light-shielding layer 50 and the filter layer 40 is relatively short, which can improve alignment accuracy of the light-shielding layer 50 and the filter layer 40. Specifically, the display panel 100 may be a liquid crystal display panel. After the light-shielding layer 50 and the filter layer 40 are aligned, liquid crystal molecules may be disposed between the light-shielding layer 50 and the filter layer 40. It should be noted that, as shown in FIGS. 1 and 4, the lower substrate 60 located on the side of the filter layer 40 away from the upper substrate 10 may be a thin film transistor array substrate, on which voltages of different regions are different from a voltage on the composite electrode layer 20, that is, there is a voltage difference between each region on the thin film transistor array substrate and the composite electrode layer 20, and the voltage difference can drive at least one of the corresponding liquid crystal molecules to deflect, and cooperate with the corresponding filter portion 401 to present the corresponding color.

In an embodiment, the display panel 100 may be an organic light-emitting diode (OLED) display panel. In this case, the filter layer 40 and the light-shielding layer 50 may be provided in the same layer, and the plurality of filter portions 401 and the plurality of light-shielding portions 501 are alternately arranged, that is, the light-shielding portions 501 are configured to prevent the light passing through adjacent ones of the filter portions 401 from color mixing. Further, a planarization layer and a light-emitting layer may be sequentially arranged on the plurality of the filter portions 401 and the plurality of the light-shielding portions 501, and the light-emitting layer may emit white light toward a side close to the filter portions 401, and the white light passes through the filter layer 40 to realize color display.

The present application further provides a method of manufacturing a display panel. The method of manufacturing the display panel includes but is not limited to the following embodiments and combinations of the following embodiments.

Figure 6:
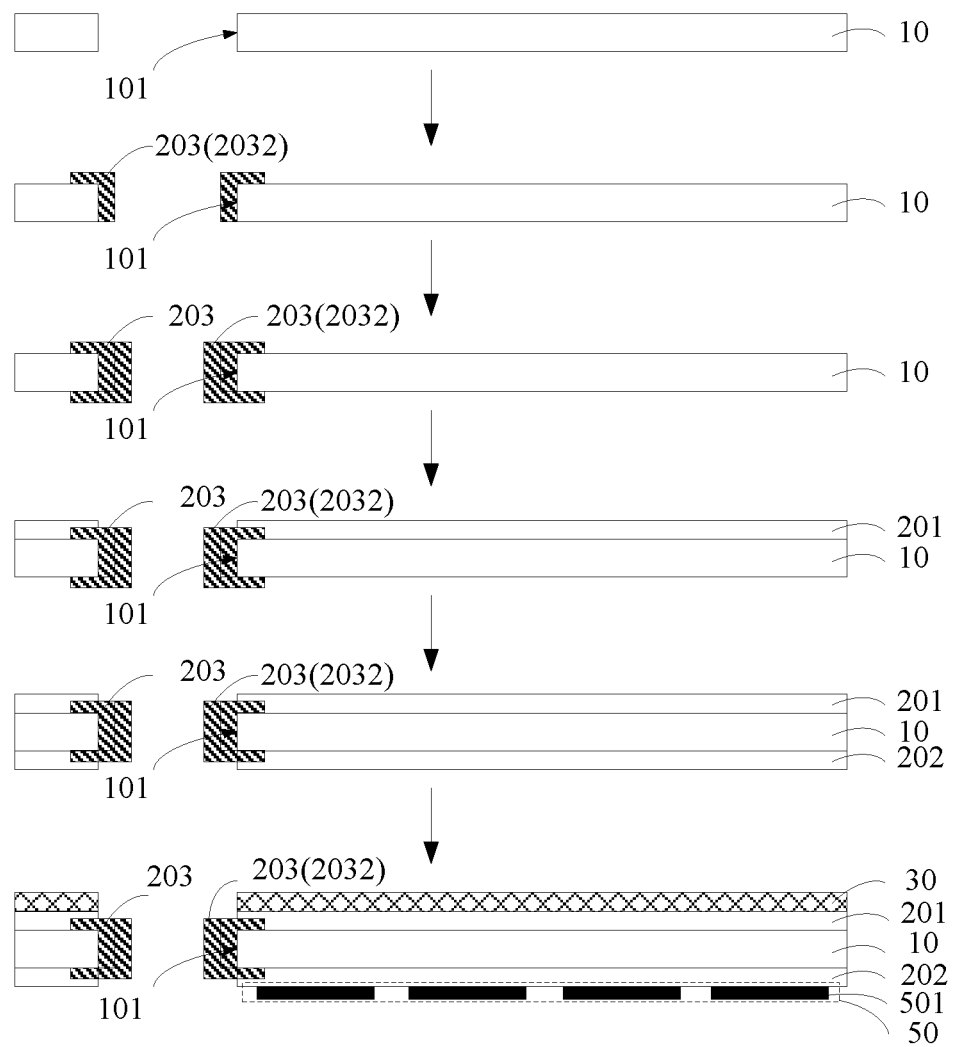
FIG. 6 is a schematic diagram of a scene of a method of manufacturing a display panel provided by an embodiment of the application.

In an embodiment, as shown in FIGS. 5 and 6, the method may include but is not limited to the following steps.

S10, providing an upper substrate 10.

As shown in FIG. 6, the upper substrate 10 may be a rigid substrate or a flexible substrate, wherein the rigid substrate may be glass or a silicon wafer, and the rigid substrate may be made of a material including, but not limited to, at least one of quartz powder, strontium carbonate, barium carbonate, boric acid, boric anhydride, aluminum oxide, calcium carbonate, barium nitrate, magnesium oxide, tin oxide, or zinc oxide; and wherein the flexible substrate may be a polymer material substrate, a metal foil substrate, an ultra-thin glass substrate, a composite substrate of polymers and inorganics, or a composite substrate of polymers, organics, and inorganics, and the polymer material may include at least one of polyethylene, polypropylene, polystyrene, poly-ethylene terephthalate, polyethylene terephthalate, or polyimide.

S20, forming a first electrode layer 201 on one side of the upper substrate by magnetron sputtering, vacuum evaporation, or inkjet printing.

The first electrode layer 201 is electrically conductive and in a transparent color. Specifically, a material of the first electrode layer 201 may include, but is not limited to, ITO formed by magnetron sputtering.

S30, forming a second electrode layer 202 on a side of the upper substrate away from the first electrode layer 201 by magnetron sputtering, vacuum evaporation, or inkjet printing. The first electrode layer 201 and the second electrode layer 202 are electrically connected to each other.

For the second electrode layer 202, reference may be made to the related description of the first electrode layer 201 above.

It can be understood that, as shown in FIG. 1, the first electrode layer 201 and the second electrode layer 202 in this embodiment are respectively disposed on opposite sides of the upper substrate 10 and are electrically connected to each other, that is, the first electrode layer 201 and the second electrode layer 202 can be electrically connected to form a conductive composite electrode layer 20 through electrical connection. Compared with the prior art where an electrode layer is only disposed a side of an upper substrate 10 close to a lower plate, the composite electrode layer 20 in this embodiment exhibits a lower resistance, that is, a capacitive coupling effect between the composite electrode layer 20 and a data line on a lower plate is smaller, which can alleviate horizontal crosstalk, and the composite electrode layer 20 has less influence on a signal in the data line on the lower plate, thus ultimately improving quality of displayed image. It should be noted that since the first electrode layer 201 in this embodiment is located on the side of the upper substrate 10 away from the second electrode layer 202, that is, a distance between a side of the composite electrode layer close to the lower plate and the lower plate will not be decreased, that is, compared with a distance between the electrode layer and the lower plate in the prior art, the distance between the composite electrode layer 20 and the lower plate in this embodiment is not decreased, and that is, the composite electrode layer 20 will not increase the interference on the signal in the data line on the lower plate.

S40, arranging the upper substrate and the lower substrate opposite to each other, and filling a liquid crystal layer between the lower substrate and the upper substrate.

After the upper substrate and the lower substrate are assembled, an opening may be reserved, through which liquid crystal molecules are poured between the assembled upper substrate and lower substrate to form the liquid crystal layer, and then the opening is closed to prevent damage to the liquid crystal layer.

In one embodiment, as shown in FIG. 6, the display panel includes a non-display area, the upper substrate 10 includes at least one via hole 101, and each of the via hole 101 is located in the non-display area. Before the step S20, the method may further include but is not limited to the following steps.

S101, forming a conductive portion 203 at an upper side and a lower side around the via hole 101 and a sidewall of the via hole 101 by vapor deposition, wherein the conductive portion is electrically connected to the first electrode layer and the second electrode layer.

It is appreciated that each of the via holes 101 is located in the non-display area to prevent hollowing out in the display area to impact the image display. Further, the non-display area may be, but not limited to, an area close to an edge of the display panel. When the upper substrate 10 includes a via hole 101, the via hole 101 may be located in an area close to either side of the upper substrate 10, and the conductive portion 203 is located in the via hole 101, and a size of the via hole 101 can be set larger to ensure that the first electrode layer 201 and the second electrode layer 202 are electrically connected to each other. When the upper substrate 10 includes a plurality of the via holes 101, the plurality of via holes 101 may be arranged at least on opposite sides of the upper substrate 10, and sizes of the plurality of via holes 101 may be the same or different, a number and sizes of the via holes 101 can be set reasonably to ensure that the first electrode layer 201 and the second electrode layer 202 are electrically connected to each other. Of course, the plurality of the via holes 101 may also be at least arranged at an area near two ends of a diagonal line of the upper substrate and the conductive portion 203 is located in at least one of the via holes 101 in the area near the two ends of one of the diagonal lines in the upper substrate 10.

It should be noted that, according to the above analysis, it can be known that the upper substrate 10 includes at least one via hole 101, that is, the via hole 101 is formed before forming the first electrode layer 201, and the receiving space used to support the conductive ball 2031 cannot be formed at this time, so the conductive portion 203 here can be the metal layer 2032, that is, after the via hole 101 is formed, the metal layer 2032 can be formed on the upper and lower sides of the area around the via hole 101 by vapor deposition, and the metal layer 2032 are also formed on the sidewall of the via hole 101.

It is appreciated that the first electrode layer 201 may also be formed before the at least one via hole 101 is formed, and then the electrode layer 201 is configured to serve as a support to form a receiving space with the via hole 101 for placing at least one of the conductive balls 2031 therein. Alternatively, the first electrode layer 201 is formed before at least one of the via holes 101 is formed, and the metal layer 2032 is formed on a bottom and sidewalls of the receiving space formed by the first electrode layer 201 and the via hole 101, and the metal layer 2032 extends to upper and lower sides around the via hole 101. Specific descriptions for the conductive ball 2031 and the metal layer 2032 may be referred to the relevant description above, and here the upper substrate 10 including at least one via hole 101 is described for illustrative purpose only.

It should be noted that, as shown in FIG. 6, a portion of the metal layer 2032 can be formed on the upper side around the via hole 101 first, and after the upper substrate 10 is flipped over, another portion of the metal layer 2032 is formed on the upper side around the via hole 101, and then the first electrode layer 201 is formed on the side of the upper substrate 10 and the metal layer 2032. Similarly, the upper substrate is flipped over, and then the second electrode layer 202 is formed on the side of the upper substrate 10 and the metal layer 2032.

In particular, the metal layer 2032 can also be made of ITO. In this case, ITO material can be deposited on one side of the upper substrate 10 to sequentially form the metal layer 2032 filled in the via hole 101 and the first electrode layer 201, that is, the metal layer 2032 and the first electrode layer 201 can be produced through a single process. Further, the upper substrate 10 can be flipped over, and then the ITO material is deposited on the other side of the upper substrate 10 to form the second electrode layer 202 on an entire surface.

Further, as shown in FIG. 6, after the step S30, the method may further include but not limited to the following steps.

S50, forming a protective layer 30 on the first electrode layer 201, wherein the protective layer 30 is insulative.

It should be noted that the protective layer 30 on the side away from the upper substrate 10 also includes layers such as a polarizer and a cover plate. The protective layer 30 is configured to isolate the first electrode layer 201 from the layers such as the polarizer and the like to prevent affecting the electrical and optical properties of the first electrode layer 201. Further, the protective layer 30 is also in a transparent color to prevent reducing light transmittance. Specifically, a material of the protective layer 30 may include, but is not limited to, at least one of silicon nitride or silicon oxide.

Further, as shown in FIG. 6, after the step S50, the method may further include but not limited to the following steps.

S60, forming a light-shielding layer 50 on the second electrode layer 202, wherein the light-shielding layer 50 includes a plurality of light-shielding portions 501.

Similarly, the light-shielding layer 50 needs to be formed on the second electrode layer 202 after the upper substrate 10 is flipped over. Specific descriptions for the light-shielding layer 50 and the plurality of light-shielding portions 501 can be referred to the above relevant description.

Still another embodiment of the present application provides a display device, and the display device includes the display panel described above.

The present application provides a display panel, a manufacturing method thereof, and a display device. The display panel includes: a lower substrate; an upper substrate arranged opposite to the lower substrate; a liquid crystal layer filled between the lower substrate and the upper substrate; a first electrode layer disposed on a side of the upper substrate close to or away from the liquid crystal layer; and a second electrode layer disposed on a side of the upper substrate away from the first electrode layer, and electrically connected to the first electrode layer.

In this solution, the first electrode layer and the second electrode layer that are electrically connected to each other are respectively provided on opposite sides of the upper substrate, and an overall resistance of the first electrode layer and the second electrode layer is relatively small, that is, a capacitive coupling effect between an entirety of the first electrode layer and the second electrode layer and a data line on a lower plate is weakened, and therefore it can shorten the time period for the first electrode layer and the second electrode layer to return to the preset potential to weaken the horizontal crosstalk, and can also reduce influence on a signal in the data line, and ultimately improving quality of displayed image.

The display panel, the manufacturing method thereof, and the display device provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not deportion the spirit of the corresponding technical solutions beyond the scope of the technical solutions of the embodiments of the present application.

What is claimed is:

1. A display panel, comprising:
a lower substrate having data lines;
an upper substrate arranged opposite to the lower substrate;
a liquid crystal layer filled between the lower substrate and the upper substrate;
a first electrode layer disposed on a side of the upper substrate awayfrom the liquid crystal layer; and
a second electrode layer disposed on a side of the upper substrate away from the first electrode layer,
wherein the upper substrate comprises at least one via hole, a metal layer is located in the at least one via hole and extends from a sidewall of the via hole to an upper side and a lower side of the upper substrate, a thickness of the metal layer is greater than a thickness of the upper substrate, and a thickness of the metal layer on the upper side of the upper substrate and a thickness of the metal layer on the lower side of the upper substrate are respectivelysmaller than that of the first electrode layer and the second electrode layer, and
the first electrode layer and the second electrode layer are electrically connected to each other through the metal layer, and each of the first electrode layer and the second electrode layer extends into a display area of the display panel.

2. The display panel according to claim 1, wherein the display panel comprises a non-display area, and each of the at least one via hole is located in the non-display area.

3. The display panel according to claim 2, wherein the upper substrate comprises a plurality of via holes, and the plurality of via holes are arranged at least on opposite sides of the upper substrate.

4. The display panel according to claim 1, wherein the metal layer and the first electrode layer are made of a same material.

5. The display panel according to claim 1, wherein a resistivity of the metal layer is less than a resistivity of the first electrode layer, and a resistivity of the metal layer is less than a resistivity of the second electrode layer.

6. The display panel according to claim 1, wherein the display panel further comprises:

a protective layer disposed on a side of the first electrode layer away from the upper substrate, and the protective layer being insulative.

7. The display panel according to claim 1, further comprising:
a filter layer arranged on the lower substrate and opposite to the second electrode layer, wherein the filter layer comprises a plurality of filter portions, and a plurality of gaps are defined between adjacent ones of the filter portions; and
a light-shielding layer disposed on a side of the second electrode layer close to the filter layer, wherein the light-shielding layer comprises a plurality of light-shielding portions, the plurality of light-shielding portions are respectively arranged opposite to the plurality of gaps, wherein the filter and the light-shielding layer are disposed on two opposite side of the liquid crystal layer.

8. A manufacturing method of a display panel, comprising the following steps:
providing a lower substrate having data lines and an upper substrate;
forming at least one via hole on the upper substrate;
forming a metal layer in the at least one via hole, the metal layer extending from a sidewall of the via hole to an upper side and a lower side of the upper substrate;
forming a first electrode layer on a side of the upper substrate by magnetron sputtering, vacuum evaporation, or inkjet printing;
forming a second electrode layer on a side of the upper substrate away from the first electrode layer by magnetron sputtering, vacuum evaporation, or inkjet printing, wherein the first electrode layer and the second electrode layer are electrically connected to each other through the metal layer, and each of the first electrode layer and the second electrode layer extends into a display area of the display panel; and
arranging the upper substrate and the lower substrate opposite to each other, and filling a liquid crystal layer between the lower substrate and the upper substrate,
wherein a thickness of the metal layer is greater than a thickness of the upper substrate, and a thickness of the metal layer on the upper side of the upper substrate and a thickness of the metal layer on the lower side of the upper substrate are respectively smaller than that of the first electrode layer and the second electrode layer.

9. The manufacturing method of the display panel according to claim 8, wherein the display panel comprises a non-display area, and each of the at least one via hole is located in the non-display area; and
wherein the step of the metal layer in the at least one via hole:
forming the metal layer at an upper side and a lower side around the via hole and a sidewall of the via hole by vapor deposition.

10. The manufacturing method of the display panel according to claim 8, wherein after the step of forming the second electrode layer on the side of the upper substrate away from the first electrode layer by magnetron sputtering, vacuum evaporation, or inkjet printing, the method further comprises:
forming a protective layer on the first electrode layer, the protective layer being insulative.

11. The manufacturing method of the display panel according to claim 8, wherein the display panel further comprises:

a filter layer arranged on the lower substrate and opposite to the second electrode layer, wherein the filter layer comprises a plurality of filter portions, and a plurality of gaps are defined between adjacent ones of the filter portions; and
a light-shielding layer disposed on a side of the second electrode layer close to the filter layer, wherein the light-shielding layer comprises a plurality of light-shielding portions, the plurality of light-shielding portions are respectively arranged opposite to the plurality of gaps, wherein the filter and the light-shielding layer are disposed on two opposite side of the liquid crystal layer.

12. A display device, wherein the display device comprises a display panel, and the display panel comprises:
a lower substrate having data lines;
an upper substrate arranged opposite to the lower substrate;
a liquid crystal layer filled between the lower substrate and the upper substrate;
a first electrode layer disposed on a side of the upper substrate awayfrom the liquid crystal layer; and
a second electrode layer disposed on a side of the upper substrate awayfrom the first electrode layer,
wherein the upper substrate comprises at least one via hole, a metal layer is located in the at least one via hole and extends from a sidewall of the via hole toan upper side and a lower side of the upper substrate, a thickness of the metal layer is greater than a thickness of the upper substrate, and a thickness of the metal layer on the upper side of the upper substrate and a thickness of the metal layer on the lower side of the upper substrate are respectively smaller than that of the first electrode layer and the second electrode layer, and
the first electrode layer and the second electrode layer are electrically connected to each other through the metal layer, and each of the first electrode layer and the second electrode layer extends into a display area of the display panel.

13. The display device according to claim 12, wherein the display panel comprises a non-display area, and each of the at least one via hole is located in the non-display area.

14. The display device according to claim 13, wherein the upper substrate comprises a plurality of via holes, and the plurality of via holes are arranged at least on opposite sides of the upper substrate.

15. The display device according to claim 12, wherein a resistivity of the metal layer is less than a resistivity of the first electrode layer, and a resistivity of the metal layer is less than a resistivity of the second electrode layer.

16. The display device according to claim 12, wherein the display panel further comprises:
a filter layer arranged on the lower substrate and opposite to the second electrode layer, wherein the filter layer comprises a plurality of filter portions, and a plurality of gaps are defined between adjacent ones of the filter portions; and
a light-shielding layer disposed on a side of the second electrode layer close to the filter layer, wherein the light-shielding layer comprises a plurality of light-shielding portions, the plurality of light-shielding portions are respectively arranged opposite to the plurality of gaps, wherein the filter and the light-shielding layer are disposed on two opposite side of the liquid crystal layer.

* * * * *